United States Patent
Ruegg

[15] 3,692,797
[45] Sept. 19, 1972

[54] 3-(5-NITRO-2-THIENYL)-1-OXA-2,4-DIAZASPIRO(4,5)-DEC-2-ENE

[72] Inventor: Rudolf Ruegg, Bottmingen, Switzerland

[73] Assignee: Hoffmann-La Roche Inc., Nutley, N.J.

[22] Filed: March 26, 1971

[21] Appl. No.: 128,571

[30] Foreign Application Priority Data

April 24, 1970 Switzerland..............6171/70

[52] U.S. Cl..........260/307 F, 260/329 AM, 424/272
[51] Int. Cl..............................................C07d 85/52
[58] Field of Search....................260/307 F

[56] References Cited

OTHER PUBLICATIONS

Ainsworth et al., J. Med. Chem. 10(2), p. 208–210, (1967).

*Primary Examiner*—Alex Mazel
*Assistant Examiner*—R. V. Rush
*Attorney*—Samuel L. Welt, Jon S. Saxe, Bernard S. Leon, Gerald S. Rosen, R. Hain Swope and William M. Farley

[57] ABSTRACT

3-(5-Nitro-2-thienyl)-1-oxa-2,4-diazaspiro[4,5]-dec-2-ene and a process for its preparation are described. The subject compound is therapeutically active against filariasis schistosomasis and similar diseases.

1 Claim, No Drawings

3-(5-NITRO-2-THIENYL)-1-OXA-2,4-DIAZASPIRO(4,5)-DEC-2-ENE

DETAILED DESCRIPTION OF THE INVENTION

This relates to the novel compound 3-(5-nitro-2-thienyl)-1-oxa-2,4-diazaspiro[4,5]Dec. 2-ene which possesses valuable pharmacological properties. The invention also concerns therapeutic compositions containing said compound and a therapeutically inert, pharmaceutical acceptable carrier material. The invention is further directed to a process for the preparation of said compound.

The novel therapeutic agent of the present invention, 3-(5-nitro-b2-thienyl)-1-oxa-2,4-diazaspiro[4,5]-dec-2-ene which may be structurally represented as follows

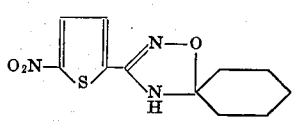

I is produced according to the invention by the reaction of an amidoxime represented by the formula

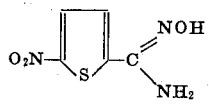

II with cyclohexanone or a ketal thereof.

The reaction conditions under which the conversion of the compound of formula II to the compound of formula I is effected are not particularly critical and will vary in a manner obvious to a person skilled in the art. Thus, the reaction may be carried out in the absence of solvent, or in the presence of an inert organic solvent. Examples of suitable inert organic solvents include ethers such as, for example, diisopropyl ether or tetrahydrofuran; alcohols such as, for example, methanol or ethanol; hydrocarbons such as, for example, benzene or toluene; halogenated hydrocarbons such as, for example, chloroform or dichloroethylene; highly polar solvents such as dimethylformamide, and the like.

The pressure at which the reaction is carried out is not a critical factor. The reaction is usually carried out in an open vessel. If, however, a solvent is utilized which has a boiling point below the reaction temperature a closed system such as an autoclave is utilized. If the boiling point of the solvent utilized approximates the reaction temperature, the reaction is then carried out under reflux conditions.

The reaction temperature is also not particularly critical. The temperature range is between a practical lower limit of about 20° C. and that temperature where decomposition of the starting material and/or the reaction product begins to occur. Generally, a temperature in the range of between about 70°C. and about 150°C. is utilized. Preferably, the reaction is carried out at a temperature in the range of from about 90°C. to about 120°C.

As has been stated, the compound of formula II is reacted with cyclohexanone or the ketal thereof.

Preferred ketals are the lower alkyl ketals. Most preferred is the diethyl ketal.

The therapeutically active substance of the present invention, 3-(5-nitro-2-thienyl)-1-oxa-2,4-diazaspiro[4,5]-dec-2-ene is effective in combatting protozoa, particularly trypanosomes, and amoebae. The compound has a particularly marked activity against *Trypanosoma cruzi*. It has been found that 50 percent of mice (average weight about 20.0 g) infected with lethal quantity of *Trypanosoma cruzi* survive after oral administration of a dosage of from 30 to 40 mg/kg of 3-(5-nitro-2-thienyl)-1-oxa-2,4-diazaspiro[4,5]-dec-2-ene. The superior efficacy of this compound is realized when it is considered that the acute toxicity thereof in a ten day test is above 5,000 mg./kg.

The activity of 3-(5-nitro-2-thienyl)-1-oxa-2,4-diazaspiro[4,5]-dec-2-ene against Trypanosoma is comparable with the prior art compound 5-nitro-fur-fural-semicarbazone. The superior efficacy of 3-(5-nitro-1-thienyl)-1-oxa-2,4-diazaspiro[4,5]-dec-2-ene over this compound, however, is apparent when it is considered that 5-nitro-furfural-semicarbazone has a toxicity in a ten day test of between 350 and 500 mg./kg.

The high activity-low toxicity characteristics of 3-(5-nitro-2-thienyl)-1-oxa-2,4-diazaspiro[4,5]-dec-2-ene render it highly efficacious for the treatment of acute or chronic cases of chagas disease or amoebiasis wherein treatment usually extends from 5 to 20 days and beyond. The dosage utilized in such treatment is usually adjusted in accordance with the stage and severity of the disease. In most clinical situations, the active compound of the present invention is administered in daily dosages ranging from about 250 mg. to about 1,000 mg. (corresponding to from about 5 mg. to about 20 mg./kg./day). This dosage is conveniently administered orally in the form of tablets which can contain 50 mg., 100 mg. or 250 mg. of active ingredient.

Further, 3-(5-nitro-2-thienyl)-1-oxa-2,4-diazaspiro[4,5]-dec-2-ene has been found to possess therapeutic activity against the parasitic worms Filaria and Schistosoma in mammalian hosts, particularly against Macrofilaria such as, for example, *Litomosoides carinii*, and Schistosoma such as, for example, *Schistosoma mansoni*. For example, cotton rats (weighing about 180 g each) infected with about 100 adult worms of Litomosoides carinii after oral administration of a dosage of about 250 mg./kg. of 3-(5-nitro-2-thienyl)-1-oxa-2,4-diazaspiro[4,5]-dec-2-ene daily for 5 consecutive days were cured. As the acute toxicity of 3-(5-nitro-2-thienyl)-1-oxa-2,4-diazaspiro[4,5]-dec-2-ene upon oral administration to mice over a period of 10 days has been shown to be over 5,000 mg./kg., the compound possesses marked efficaciousness as a macrofilaricide.

3-(5-Nitro-2-thienyl)-1-oxa-2,4-diazaspiro[4,5]-dec-2-ene is also highly effective in the treatment of disease caused by Filaria-artea such as, for example, *Wuchereria bancrofti*, *Brugia malayi* and *Onchocerca volvulus*. The treatment of such diseases in accordance with the invention generally extends for from 5 to 10 days, depending on the stage and severity of the disease. In a preferred method of treatment, pharmaceutical compositions containing from about 250 mg. to about 1,000 mg. corresponding to from about 5 to about 20 mg./kg. of active substance are administered daily. Such compositions are administered preferably in the form of tablets containing 50 mg., 100 mg. or 250 mg. of active drug.

In accordance with the invention, 3-(5-nitro-2-thienyl)-1-oxa-2,4-diazaspiro[4,5]-dec-2-ene is administered enterally in the form of pharmaceutically acceptable dosage units, i.e., tablets, capsules, dragees and the like, Such dosage units are produced by admixing the active ingredient with conventional pharmaceutical inert carrier materials by methods well known in the art of pharmaceutical compounding. Examples of suitable inert carrier material include organic and inorganic substances such as, lactose, sorbitol, mannitols, starches such as, potato starch, maize starch or amylopectin; lubricants such as, magnesium or calcium stearate or polyethylene glycols of suitable molecular weight, and the like. The tablets may be coated, e.g., with concentrated sugar solutions which can also contain substances such as gum arabic, talcum and/or titanium dioxide, or with a lacquer dissolved in easily volatile organic solvents or mixtures of such solvents. Dyestuffs can be added to these coatings, e.g., to distinguish between dosage forms containing different amounts of active substance.

The following examples describe the production of the active substance of the invention and therapeutic compositions thereof. All temperatures are given in degrees centigrade.

EXAMPLE 1

10.0 Grams of 5-nitrothiophene-2-carboxamidoxime and 20.0 ml. of cyclohexanone diethyl ketal were combined in a suitable vessel, treated with 3.0 ml. of dimethylformamide and heated at 100° for 2 hours. The mixture was then allowed to cool and the precipitate which formed was recovered by filtration. The product was recrystallized from an equal mixture of benzene and hexene to yield 3-(5-nitro-2-thienyl)-1-oxa-2,4-diazaspiro[4,5]-dec-2-ene having a m.p. of 152°–153°.

EXAMPLE 2

Capsule Formulation

| | Weight per Capsule |
|---|---|
| 3-(5-Nitro-2-thienyl)-1-oxa-2,4-diazaspiro[4,5]-dec-2-ene | 50.0 mg. |
| Lactose | 125.0 mg. |
| Corn Starch | 30.0 mg. |
| Talc | 5.0 mg. |
| Total Weight | 210.0 mg. |

PROCEDURE

The active substance was mixed with the lactose and the corn starch in a suitable mixer. The mix was then passed through a suitable comminuting machine. The blended powder was thereafter returned to the mixer, the talc added and the whole blended thoroughly. The mixture was then filled into No. 4 hard shell gelatin capsules on a capsulating machine.

EXAMPLE 3

Tablet Formulation

| | Weight per Tablet |
|---|---|
| 3-(5-Nitro-2-thienyl)-1-oxa-2,4-diazaspiro[4,5]-dec-2-ene | 50.0 mg. |
| Lactose | 144.0 mg. |
| Corn Starch | 4.0 mg. |
| Calcium Stearate | 2.0 mg. |
| Total | 200.0 mg. |

PROCEDURE

The active substance and the other ingredients were well mixed in a suitable mixer. The mixture was then compressed on a suitable tabletting machine to form slugs of about 2.5 cm. in diameter and 0.8 cm. in thickness. The slugs were then comminuted to form granules of about 1.2 mm. The granules were then compressed on a suitable tabletting machine to tablets each weighing 200 mg.

EXAMPLE 4

Dragee Formulation

| | | Weight per Tablet |
|---|---|---|
| Core: | | |
| 3-(5-nitro-2-thienyl)-1-oxa-2,4-diazaspiro[4,5]-dec-2-ene | | 50.0 mg. |
| Mannitol | | 80.0 mg. |
| Talc | | 5.0 mg. |
| Corn Starch | | 15.0 mg. |
| Core Weight | | 150.0 mg. |
| Coating Mass Weight | | |
| Sugar | 90% | 150.0 mg. |
| Rice Starch | 5% | |
| Talc | 5% | |
| Total Weight | | 300.0 mg. |

PROCEDURE

The active substance was mixed with the mannitol and passed through a No. 5 sieve. The corn starch was then boiled with sufficient water to form a 10 percent paste. The powder mixture was then homogeneously ground with the starch paste. The resulting slightly moist mass was then granulated by passage through a No. 3 sieve. The granulation was dried on paper-lined trays. The dry granulation was mixed with the talc and compressed to biconvex cores of 150 mg. weight and approximately 8.0 mm. diameter. The cores were then coated by the conventional dredging process with the coating mass to a total weight of approximately 300 mg.

I claim:
1. 3-(5-Nitro-2-thienyl)-1-oxa-2,4-diazaspiro[4,5]-dec-2-ene.

* * * * *